Dec. 24, 1929.  E. O. CARVIN  1,740,537
TREAD CLEARER
Filed Sept. 10, 1928
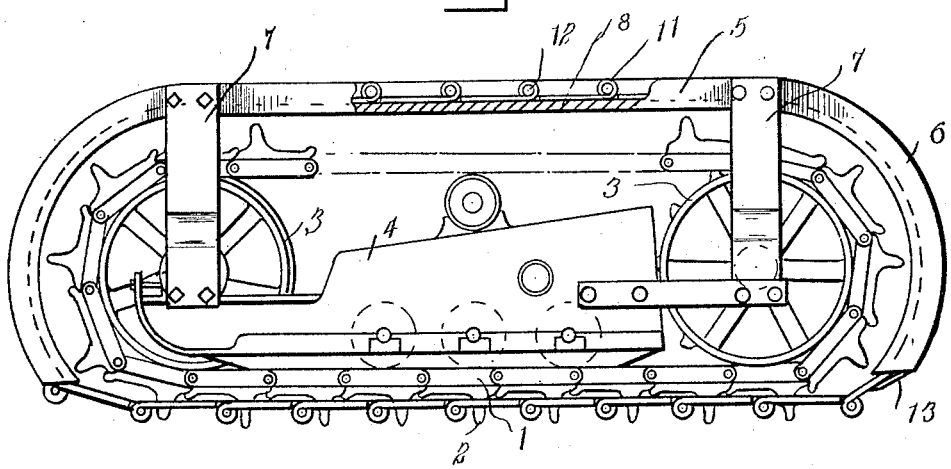
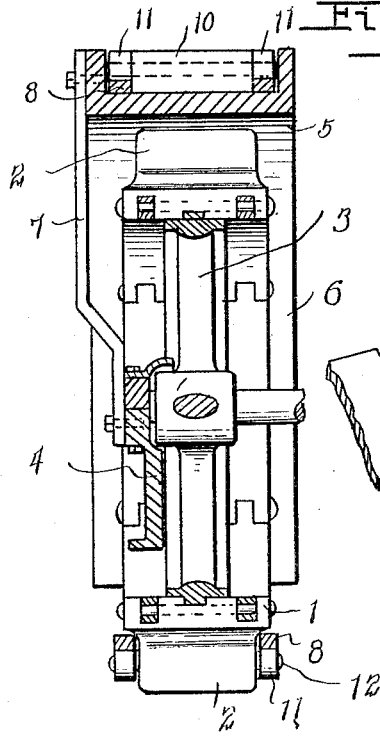
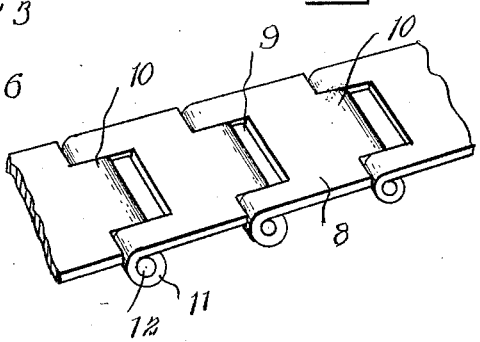
INVENTOR.
E. O. Carvin
BY
Lacey & Lacey, ATTORNEYS Patented Dec. 24, 1929

1,740,537

UNITED STATES PATENT OFFICE

EDWARD O. CARVIN, OF SIERRA CITY, CALIFORNIA

TREAD CLEARER

Application filed September 10, 1928. Serial No. 305,091.

This invention relates to endless tread traction devices and has for its object the provision of a simple, inexpensive and efficient device which may be readily applied to any endless traction tread and will operate to remove accumulations of snow, ice or mud therefrom. It is well known that traction devices frequently accumulate so much mud, snow or other matter that the efficient operation of the device is obstructed and sometimes entirely arrested so that the use of the machine to which the tread is applied is lost while the accumulations are being removed. My invention provides means whereby the traction cleats are automatically cleared of such obstructions. The invention is illustrated in the accompanying drawing and will be hereinafter fully set forth.

In the drawing:

Figure 1 is a side elevation partly in section of an endless chain traction tread device having my invention applied thereto;

Fig. 2 is a transverse section of the same, and

Fig. 3 is a detail perspective view of a portion of the tread clearer.

The tread member comprises an endless chain of links 1, each of which is provided with a traction cleat 2 and the tread member is mounted upon pulleys or sprocket wheels 3 in the usual manner, the structure being supported and guided by a framework, indicated as an entirety by the numeral 4, which is supported upon a tractor or other vehicle in any convenient manner.

In carrying out the present invention, there is provided a track or guide member 5 consisting of a channeled bar having its ends turned downwardly to provide arcuate terminals 6 adjacent the pulleys or sprocket wheels 3 and terminating approximately in the horizontal plane of the lower run of the endless tread 1, as shown in Fig. 1. This guide may be supported in any convenient manner, and I have illustrated hanger brackets 7 which are secured at their lower ends to the framework 4 and at their upper ends to the guide 5 so that the guide will be mounted in proper relation to the endless tread, as clearly shown. Trained about the guide frame 5 is a clearing element consisting of an endless chain of pivotally connected links 8, each of which is provided with a notch 9 at one end and a tongue 10 at its opposite end, the tongue being curved or doubled upon itself to provide an eye or loop element to aline with eyes or loops 11 formed on the meeting notched end of an adjacent link and receiving a pivot 12, as will be understood and as is shown. The notch 9 has a greater extent longitudinally of the chain than the tongue 10 and thereby provides an open space through which the traction cleats 2 of the endless tread project, as clearly shown in Fig. 1. The parts are so proportioned that the traction cleats 2 project downwardly below the lowest point of the several eyes 11, as shown in Fig. 1, so that the cleats will have sufficient tractive engagement with the surface of the ground while the eyes will be maintained out of contact with the ground and wear upon the eyes will be thereby avoided. The clearer chain is supported by the upper portion of the guide frame 5 and motion is imparted to the clearer chain by the engagement of the traction cleats therewith so that, as the vehicle travels over the ground, the clearer chain will travel with the tread member in an obvious manner. Inasmuch as the end portions of the guide frame are spaced radially outward from the pulleys or sprocket wheels which support and drive the tread chain, the links of the clearer will move relatively outward upon the traction cleats as the links of the tread chain pass around the supporting and driving pulleys or sprockets and, consequently, the cleats will slide upwardly through and from the several notches 9 and the walls of said notches will, consequently, scrape from the cleats any accumulation of snow, ice or mud which may be adhering thereto. At the lower rear end of the guide is a transverse blade 13 which bears against the clearer links to remove any matter which may be clinging thereto. The traction tread will, consequently, be kept free for efficient operation automatically without any attention on the part of the operator. My device is exceedingly simple and may be readily applied to any endless traction tread or to traction wheels without necessitating any structural changes therein.

Having thus described the invention, I claim:

A clearing attachment for endless chain tread members comprising an endless chain of pivotally connected links, each link having a transverse slot to receive a traction cleat on the endless tread, and a channeled guiding frame supporting said clearer chain and having arcuate downturned terminals spaced radially outward from the end portions of the tread.

In testimony whereof I affix my signature.

EDWARD O. CARVIN. [L. S.]